United States Patent
Bahia et al.

(10) Patent No.: US 12,321,941 B2
(45) Date of Patent: *Jun. 3, 2025

(54) ELECTRONIC TRANSACTION SYSTEM

(71) Applicant: Visa Europe Limited, London (GB)

(72) Inventors: Onkar S. Bahia, London (GB); Jacques Antoine-Godet, London (GB); Edward Cummins, London (GB); Klaus Kroger, London (GB)

(73) Assignee: VISA EUROPE LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,175

(22) Filed: Aug. 3, 2023

(65) Prior Publication Data
US 2023/0376958 A1    Nov. 23, 2023

Related U.S. Application Data

(63) Continuation of application No. 17/046,628, filed as application No. PCT/GB2019/051011 on Apr. 5, 2019, now Pat. No. 11,763,307.

(51) Int. Cl.
*G06Q 20/40* (2012.01)
*G06Q 20/10* (2012.01)
(Continued)

(52) U.S. Cl.
CPC ..... *G06Q 20/40145* (2013.01); *G06Q 20/108* (2013.01); *G06Q 20/3221* (2013.01); *G06Q 40/02* (2013.01); *G06V 40/1365* (2022.01)

(58) Field of Classification Search
None
See application file for complete search history.

(56) References Cited

U.S. PATENT DOCUMENTS

| | | |
|---|---|---|
| 5,127,043 A | 6/1992 | Hunt et al. |
| 5,297,183 A | 3/1994 | Bareis et al. |
| (Continued) | | |

FOREIGN PATENT DOCUMENTS

| | | |
|---|---|---|
| CN | 103136663 A | 6/2013 |
| CN | 105809447 A | 7/2016 |
| (Continued) | | |

OTHER PUBLICATIONS

Chinese Application No. 201980024879.4, Notice of Allowance dated Apr. 28, 2024, 6 pages.

(Continued)

*Primary Examiner* — David P Sharvin
(74) *Attorney, Agent, or Firm* — Kilpatrick Townsend & Stockton LLP

(57) ABSTRACT

There is disclosed a method of authorising an electronic transaction, the method involving a server receiving transaction details for the electronic transaction and an identifier for a participant in the electronic transaction. The server sends the transaction details to the participant in the electronic transaction, and in return receives authorisation data from the participant, the authorisation data including authentication data authenticating the identity of the participant. The server then determines an account code identifying an account associated with the participant based on the identifier, and proceeds with the electronic payment transaction using the account code.

20 Claims, 8 Drawing Sheets

(51) Int. Cl.
    *G06Q 20/32*      (2012.01)
    *G06Q 40/02*      (2023.01)
    *G06V 40/12*      (2022.01)

(56) References Cited

U.S. PATENT DOCUMENTS

| | | | |
|---|---|---|---|
| 5,499,288 | A | 3/1996 | Hunt et al. |
| 5,835,894 | A | 11/1998 | Adcock et al. |
| 8,020,766 | B2 | 9/2011 | Hammad |
| 9,245,267 | B2 | 1/2016 | Singh |
| 9,467,293 | B1 | 10/2016 | Brainard et al. |
| 10,937,031 | B2 | 3/2021 | Monk et al. |
| 2002/0081411 | A1 | 6/2002 | Hamilton et al. |
| 2002/0082755 | A1 | 6/2002 | Tanaka |
| 2002/0163412 | A1 | 11/2002 | Xu et al. |
| 2004/0243514 | A1 | 12/2004 | Wankmueller |
| 2005/0075985 | A1* | 4/2005 | Cartmell ............... G06Q 20/04 |
| | | | 705/67 |
| 2007/0255653 | A1 | 11/2007 | Tumminaro et al. |
| 2008/0097851 | A1 | 4/2008 | Bemmel et al. |
| 2008/0103972 | A1 | 5/2008 | Lanc |
| 2009/0138366 | A1 | 5/2009 | Bemmel et al. |
| 2010/0174620 | A1 | 7/2010 | Stringfellow et al. |
| 2011/0213706 | A1 | 9/2011 | Joshi et al. |
| 2011/0276489 | A1 | 11/2011 | Larkin et al. |
| 2013/0124364 | A1 | 5/2013 | Mittal |
| 2013/0275308 | A1 | 10/2013 | Paraskeva et al. |
| 2013/0332359 | A1 | 12/2013 | Qteishat |
| 2014/0196118 | A1 | 7/2014 | Weiss |
| 2014/0245419 | A1 | 8/2014 | Wolberg-Stok et al. |
| 2014/0372319 | A1 | 12/2014 | Wolovitz |
| 2015/0199689 | A1 | 7/2015 | Kumnick |
| 2017/0011406 | A1 | 1/2017 | Tunnell et al. |
| 2017/0032369 | A1 | 2/2017 | Hugot |
| 2017/0193500 | A1 | 7/2017 | Hugot |
| 2017/0295155 | A1 | 10/2017 | Wong |
| 2017/0352032 | A1 | 12/2017 | Mohsenzadeh |
| 2020/0151690 | A1 | 5/2020 | Hammad |

FOREIGN PATENT DOCUMENTS

| | | |
|---|---|---|
| EP | 2515567 A1 | 10/2012 |
| JP | 63193694 | 8/1988 |
| JP | 0273744 | 3/1990 |
| JP | 03262344 A | 11/1991 |
| JP | 10331498 | 12/1998 |
| JP | 2001265741 A | 9/2001 |
| JP | 2002176455 A | 6/2002 |
| KR | 20150034863 A | 4/2015 |
| KR | 20180006602 A | 1/2018 |
| WO | 68866 | 11/2000 |
| WO | 2010089049 A1 | 8/2010 |
| WO | 2012177168 A1 | 12/2012 |
| WO | 2013071287 A1 | 5/2013 |
| WO | 2015124776 A1 | 8/2015 |
| WO | 2016123309 A1 | 8/2016 |
| WO | 2017127875 A1 | 8/2017 |
| WO | 2017167037 A1 | 10/2017 |

OTHER PUBLICATIONS

Application No. 19 721 341.6, European Office Action dated Nov. 8, 2023.
"Global Payment Authentication Standards", GPayments Authentication, Security and Payment Solutions, Available Online at: https://www.gpayments.com/Portals/0/pdfs/global-payment-authentication-standards.pdf, Apr. 26, 2017, 14 pages.
"Multi-Factor Authentication", Wikipedia, Available Online at: https://en.wikipedia.org/wiki/Multi-factor_authentication, Mar. 23, 2018, 11 pages.
"Understanding Biometrics in Card-Not-Present Transactions", Verifi A Visa Solution, Available Online at: verifi.com/in-the-news/understanding-biometrics-card-present-transactions/, Accessed from Internet on Oct. 12, 2020, 4 pages.
Application No. EP19721341.6 , Office Action, Mailed On May 16, 2022, 6 pages.
GB1805933.7 , "Combined Search and Examination Report", Sep. 27, 2018, 6 pages.
Gupta et al., "Comparative Study of Different Biometric Authorization for Mobile Payment System", Proceedings published in International Journal of Computer Applications® (IJCA), Dec. 17-18, 2012, pp. 21-24.
Marques et al., "Smart Cards: Remote Authentication using Biometrics", Instituto Superior Tecnico/INESC-ID, 12 pages.
Application No. PCT/GB2019/051 011 , International Search Report And Written Opinion, Mailed On Jun. 3, 2019, 12 pages.
Summers , "Mastercard's 'selfie Pay' Comes to Europe", Oct. 4, 2016, 15 pages.

* cited by examiner

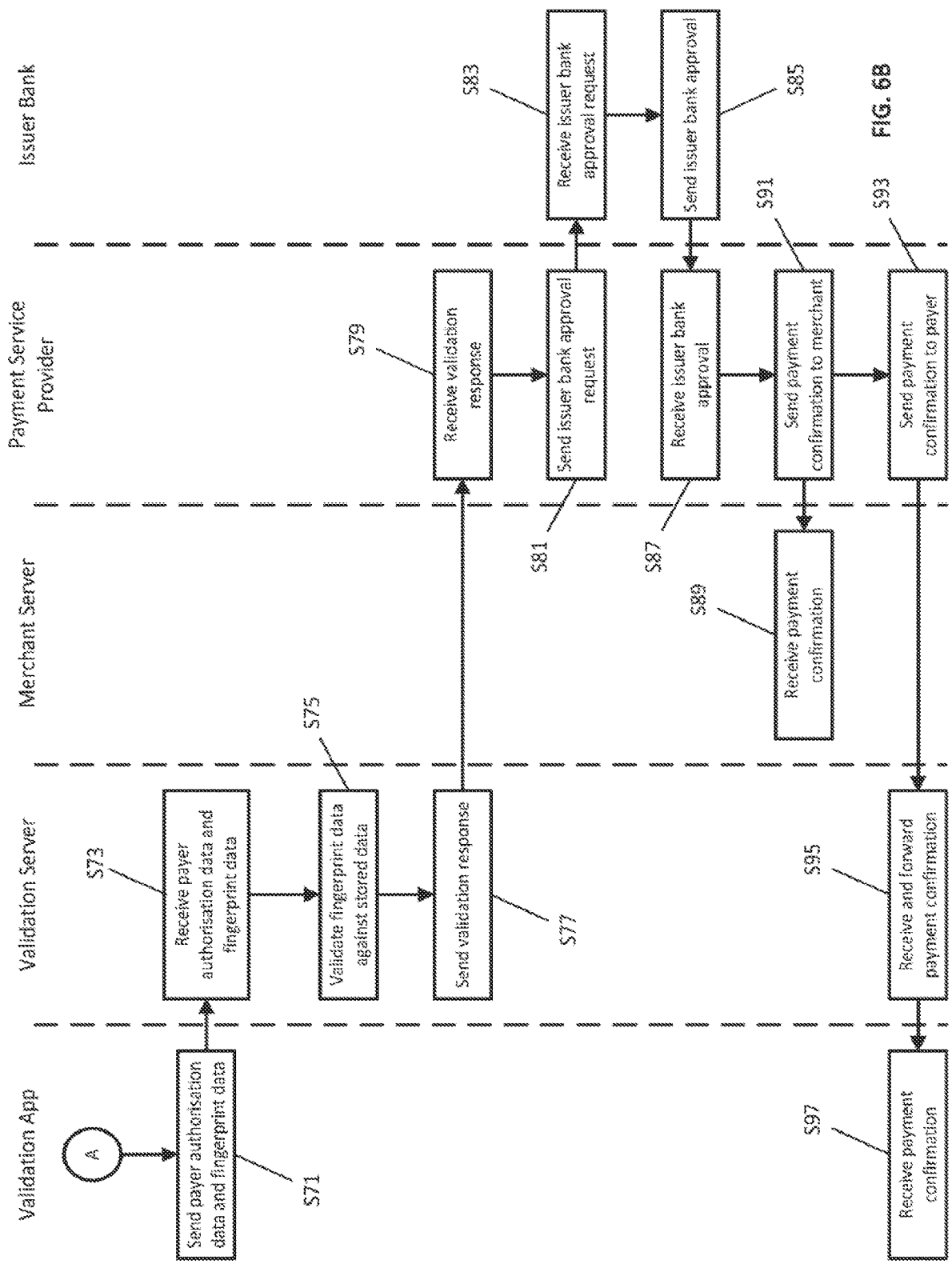

ELECTRONIC TRANSACTION SYSTEM

CROSS-REFERENCES TO RELATED APPLICATIONS

This application is a continuation application of U.S. application Ser. No. 17/046,628, filed Oct. 9, 2020, which is a National Stage of International Application No. PCT/GB2019/051011, filed Apr. 5, 2019, which claims the benefit of Great Britain Patent Application No. 1805933.7, filed Apr. 10, 2018, of which are all herein incorporated by reference.

TECHNICAL FIELD

The present invention relates to systems and methods for authorising electronic transactions. The invention has particular, but not exclusive, relevance to authorising "card not present" payment transactions.

BACKGROUND

A variety of methods for effecting electronic payment transactions exist. For example, payment may be effected using a financial instrument such as a payment card by interacting with an electronic payment terminal, which may be located at a Point of Sales (PoS) within an establishment such as a retail establishment or restaurant. In such "card present" transactions, the user of the financial instrument typically authenticates their identity by providing some form of information. For magnetic stripe payment cards, this information may be a signature. For chip-and-PIN payment devices, this information may be a PIN code. Recently, biometric data has been used to authenticate a participant in a payment transaction using a financial instrument, particularly when the financial instrument is implemented on a smartphone having a fingerprint sensor.

In contrast, other methods exist in which the card is not present at the same location as an electronic payment terminal. For example, in mail order/telephone order (MOTO) transactions card details are supplied by mail or over the telephone to be entered remotely. Such "card not present" transactions are more susceptible to fraud than card present transactions.

SUMMARY

According to an aspect, the present invention provides a method of authorising an electronic payment transaction, the method comprising a server receiving transaction details for the electronic transaction and an identifier for a participant in the electronic transaction and sending the transaction details to the participant in the electronic transaction. The server subsequently receives authorisation data from the participant, the authorisation data comprising authentication data for the participant, and verifies the authentication data for the participant. The server determines a Primary Account Number (PAN) based on the identifier, and proceeds with the electronic transaction using that PAN. In this way, information authenticating the identity of a participant in the electronic transaction can be obtained without needing a financial instrument to be present at a traditional electronic payment terminal. Further, the security of the PAN for a financial instrument of a payer participant in an electronic payment transaction is improved because the PAN need not be supplied to a payee participant (e.g. a merchant) to the electronic payment transaction.

The identifier may be a telephone number (for example the MSISDN) for the payer participant to the electronic payment transaction. From a user perspective, this has the advantage that telephone numbers are readily available and there is no need to remember an additional identifier specific to electronic payment transactions. From a system perspective, this has the advantage of simplifying the processing as, for example, the telephone number can be used to send the transaction details to the payer participant in the electronic payment transaction and only looking up details (such as the PAN) in the database if authorisation data is received from the payer participant. In other words, if the payer participant does not authorise the electronic payment transaction then there is no need to consult the database.

The telephone number may be for a mobile communications device for the payer participant, for example a smartphone to which an application for handling electronic payment transactions according to the invention has been downloaded.

The authentication data may be biometric data for the payer participant, for example fingerprint data.

The present invention has advantages in several situations. For example, for MOTO transactions, the present invention allows the identity of the financial instrument holder to be authenticated. In a similar manner, the present invention can be advantageous in other "card not present" electronic payment transactions such as web-based transactions, for example via merchant websites. The present invention also allows a financial account holder to authorise transaction initiated by another person without needing to give the PAN to that other person. For example:

a parent can authorise an electronic payment transaction initiated by their child; all the child needs to know is the telephone number of their parent;

one person on holiday who has lost their payment card can initiate an electronic payment transaction to settle their hotel bill knowing the telephone number of a relative or friend.

The transaction details received by the server include details of the payee participant. In an embodiment, the server can look up information about the payee participant and provide these details to the payer participant. For example, information that the payee participant has been associated with previous fraudulent electronic payment transactions can be provided to the payer participant, so that the payer participant can take this into account when deciding whether or not to proceed with the electronic payment transaction.

According to another aspect, the present invention provides apparatus for authorising an electronic payment transaction, the apparatus comprising at least one processor and memory storing instructions that, when executed by the processor, cause the apparatus to:

following receipt of transaction details for the electronic transaction and an identifier for a participant in the electronic transaction, send the transaction details to the participant in the electronic transaction;

following receipt of authorisation data from the participant, the authorisation data comprising biometric data for the participant, verifying the biometric data for the participant; and following verification of the biometric data for the participant, determining a Primary Account Number based on the identifier and proceeding with the electronic transaction using the Primary Account Number.

Various embodiments of the invention will now be described, by way of example only, with reference to the accompanying drawings.

BRIEF DESCRIPTION OF THE DRAWINGS

FIGS. 6A and 6B show a flow chart of operations performed by the electronic payment transaction system of FIG. 1 to carry out an electronic payment transaction.

DETAILED DESCRIPTION

Figure 1:
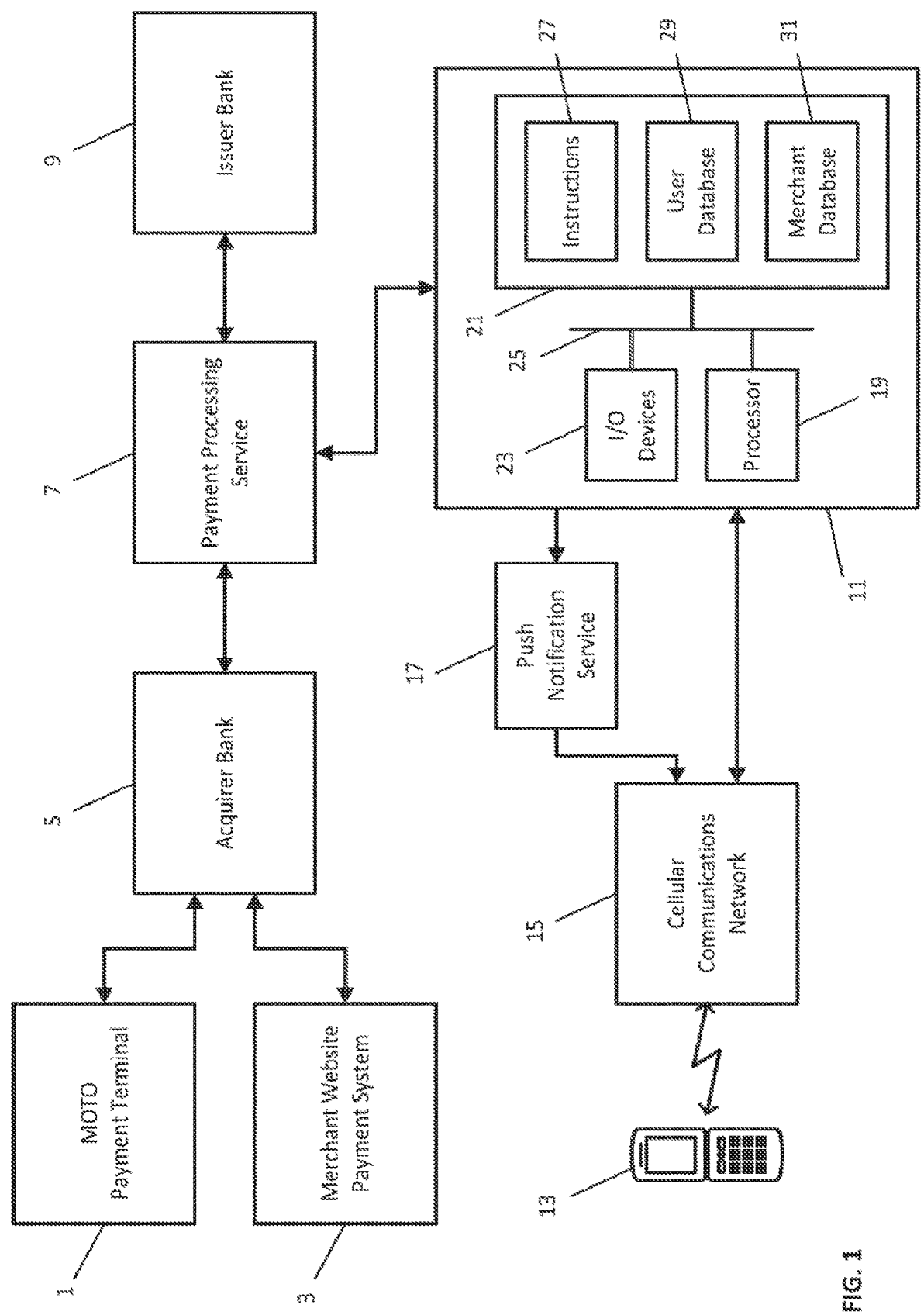
FIG. 1 schematically shows the main components of an electronic payment transaction system according to the present invention.

As shown in FIG. 1, in an embodiment of the electronic payment transaction of the invention a mail order/telephone order (MOTO) terminal 1 and a merchant website payment system 3 are connected to an acquirer bank 5 such that payment details for a purchase can be electronically communicated to the acquirer bank 5. It will be appreciated that a merchant Internet Payment Service Provider (IPSP) may provide at least some of the functionality of the MOTO terminal 1 and/or the merchant website payment system 3. The payment details for the purchase are typically entered using in a series of data fields of an Authorisation Request (0100 message) conforming to the ISO 8583 standard specification. The acquirer bank 5 is communicatively connected, vis a payment processing service 7, to the issuer bank 9 and forwards the request for authorization to the issuer bank 9.

The ISO 8583 standard specifies a data field in the 0100 message for conveying the Primary Account Number (PAN) of a financial instrument, such as a payment card, for effecting the payment transaction. In this embodiment, a payment option (hereafter for ease of reference referred to as "Biopsy") is available via the MOTO terminal 1 and the website payment system 3. As will be described in more detail hereafter, for the Biopay payment option a telephone number is provided in the PAN data field of the 0100 message, and the payment processing service recognises when the 0100 message is generated by the Biopay payment option and in response sends a validation request to a validation server 11. The validation server 11 is able to communicate with a mobile application or app (not shown in FIG. 1) on a smartphone 13 corresponding to the telephone number entered in the PAN data field via a cellular communications network 15. In order to avoid the need for a persistent link to be set up between the validation server 11 and the mobile app, the validation server 11 can initiate communication via a push notification service 17.

As shown in FIG. 1, the validation server 11 includes a processor 19, memory 21 and input/output (I/O) devices 23 interconnected by a bus system 25. Although a single processor 19 is schematically shown in FIG. 1, it will be appreciated that one or more processor devices could be utilised in the validation server 11. Similarly, the memory 21 may schematically represent one or more memory devices, and conventional memory management techniques may be used to transfer data between multiple memory devices to improve processing speed by reducing latency time.

The memory 21 stores instructions 27 for execution by the processor 19 and a user database 29 storing information related to each user that is registered on the validation server 11. In this embodiment, the entry for a user in the user database 29 includes a PAN (or a token) and fingerprint data for the user. In this embodiment, the memory 21 also stores a merchant database 31 having entries corresponding to multiple merchants, the entry for a merchant including information that may be pertinent to the electronic payment transaction such as a trust rating for the merchant.

In brief, the validation server sends details of the payment transaction to the mobile app on the smartphone 13 for authorisation by the user of the smartphone 13. Before the mobile app returns this authorisation, in this embodiment the mobile app captures fingerprint data for the user of the smartphone 13 and includes this fingerprint data in the returned authorisation. The validation server 11 can then authenticate the identity of the user of the smartphone 13 using the fingerprint data stored in the entry in the user database 29 for that user, and following authentication send the PAN (or token) in the entry in the user database for that user to the payment processing service 7, which replaces the telephone number in the PAN data field with the received PAN (or token) before passing the request for authorisation to the issuer bank 9.

Figure 2:
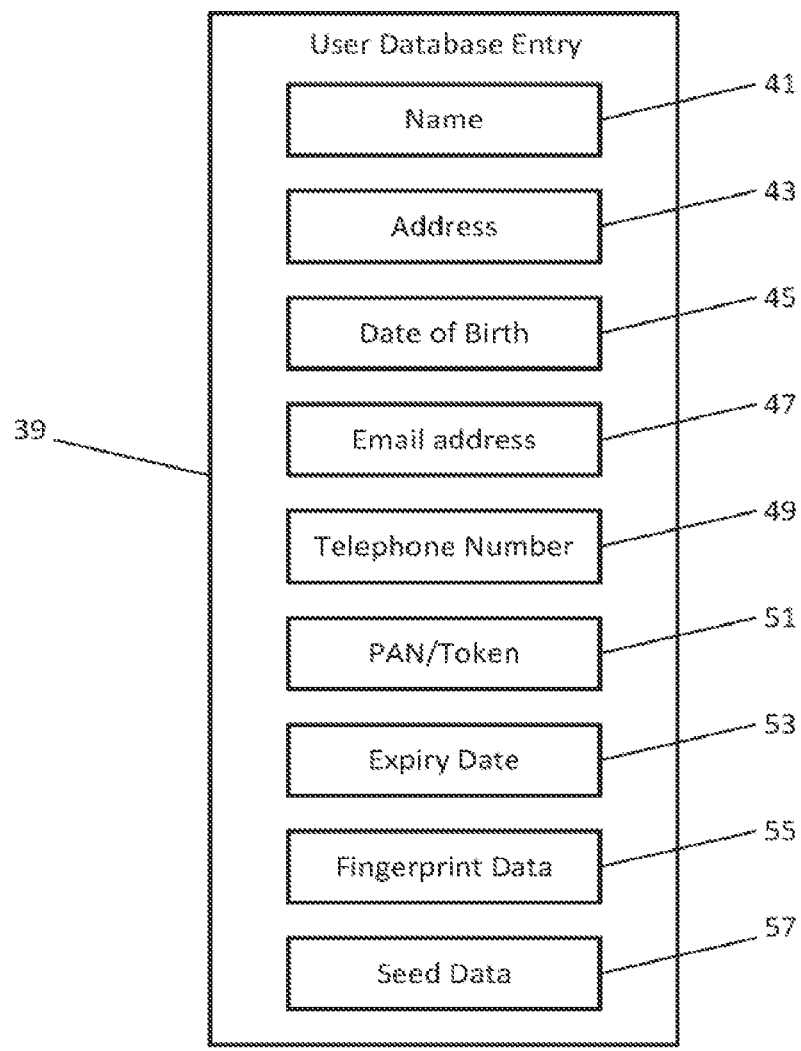
FIG. 2 schematically shows data stored in an entry in a payer database forming part of a validation server of the electronic payment transaction system of FIG. 1.

FIG. 2 shows the format of an entry 39 in the user database 29. As shown, the entry 39 includes:
  a name data field 41 for storing the name of the user;
  an address data field 43 for storing a mailing address of the user;
  a date of birth data field 45 for storing the date of birth of the user;
  an email address data field 47 for storing the email address of the user;
  a telephone number data field 49 for storing the telephone number of the smartphone 13 of the user;
  a PAN/token data field 51 for storing a PAN or a token associated with a financial instrument of the user;
  an expiry date data field 53 for storing the expiry date of the financial instrument of the user;
  a fingerprint data data field 55 for storing fingerprint data for the user; and
  a seed data data field for storing a value used in the generation of a one-time identifier code.

Figure 3:
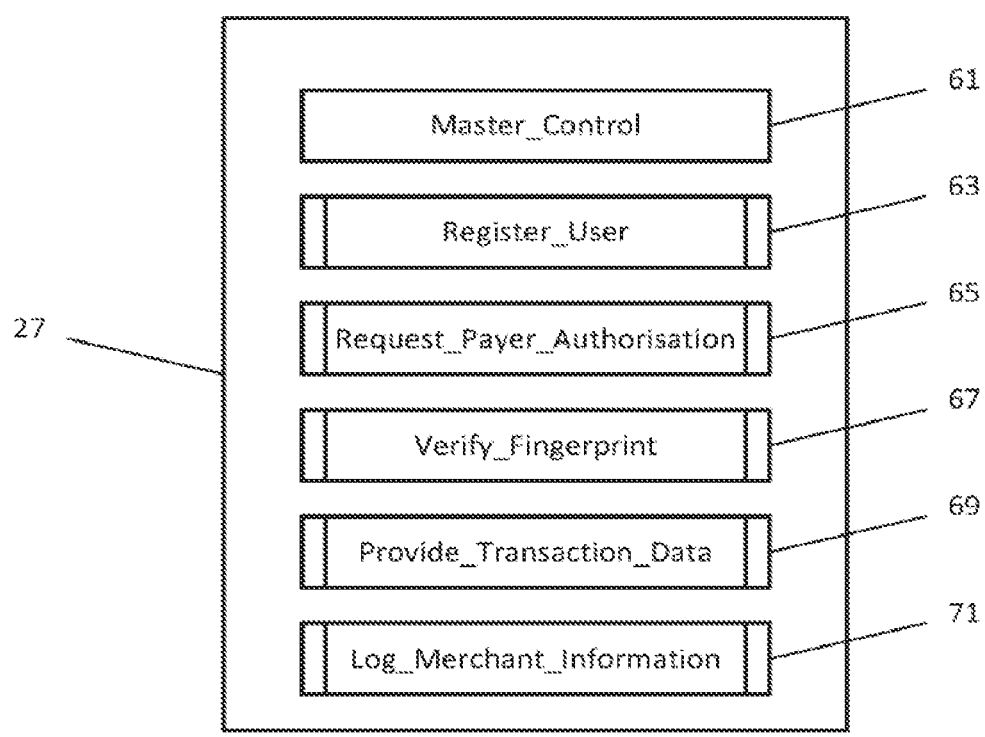
FIG. 3 schematically shows instructions stored in the validation server of the electronic payment transaction system of FIG. 1.

As shown in FIG. 3, the instructions 27 stored in the memory 21 of the validation server 11 include a Master_Control routine 61 and multiple sub-routines. The Master_Control routine 61 will initiate each sub-routine in response to a corresponding trigger condition being met. The sub-routines include:
  a Register_User sub-routine 63 that is triggered in response to receipt of a registration request by the validation server;
  a Request_Payer_Authorisation sub-routine 65 that is triggered by receipt of a validation request from the payment processing service 7;
  a Verify_Fingerprint sub-routine 67 that is triggered by receipt of authorisation data and fingerprint data from the payer;
  a Provide_Transaction_Data sub-routine 69 that is triggered by a positive verification of fingerprint data accompanying authorisation data authorising an electronic payment transaction; and a Log_Merchant_Information sub-routine 71 that is triggered in response to receiving information about a merchant that may be pertinent to an electronic payment transaction.

The operation of these sub-routines will be described in more detail hereafter.

Figure 4:
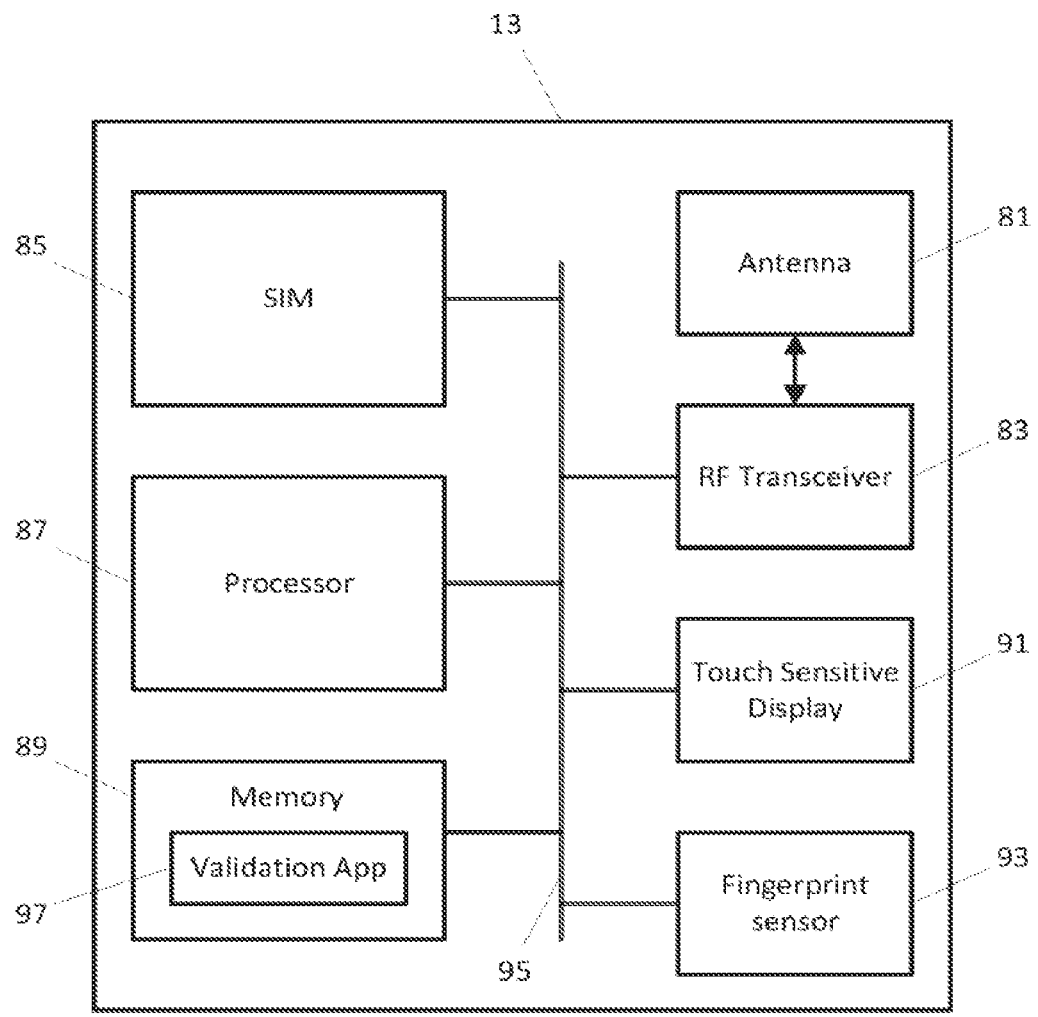
FIG. 4 schematically shows the main components of a smartphone forming part of the electronic payment transaction system of FIG. 1.

As shown in FIG. 4, the smartphone 13 includes an antenna for transmitting and receiving wireless communication signals connected to an associated RF transceiver 83. The RF transceiver 83 is interconnected with a Subscriber Identity Module (SIM) 85, a processor 87, memory 89, a touch sensitive display 91 and a fingerprint sensor 93 by a bus system 95. The operation of the RF transceiver 83, the SIM 85, the processor 87 and the touch sensitive display 91 is conventional and will not be described in more detail hereafter. It will also be appreciated that a fingerprint sensor 93 is a component that is becoming prevalent in many smartphones.

The memory 89 stores a "Biopay" application (app) 97, that can be downloaded from an app store in a conventional manner, that is associated with the Biopay payment option.

Figure 5A:
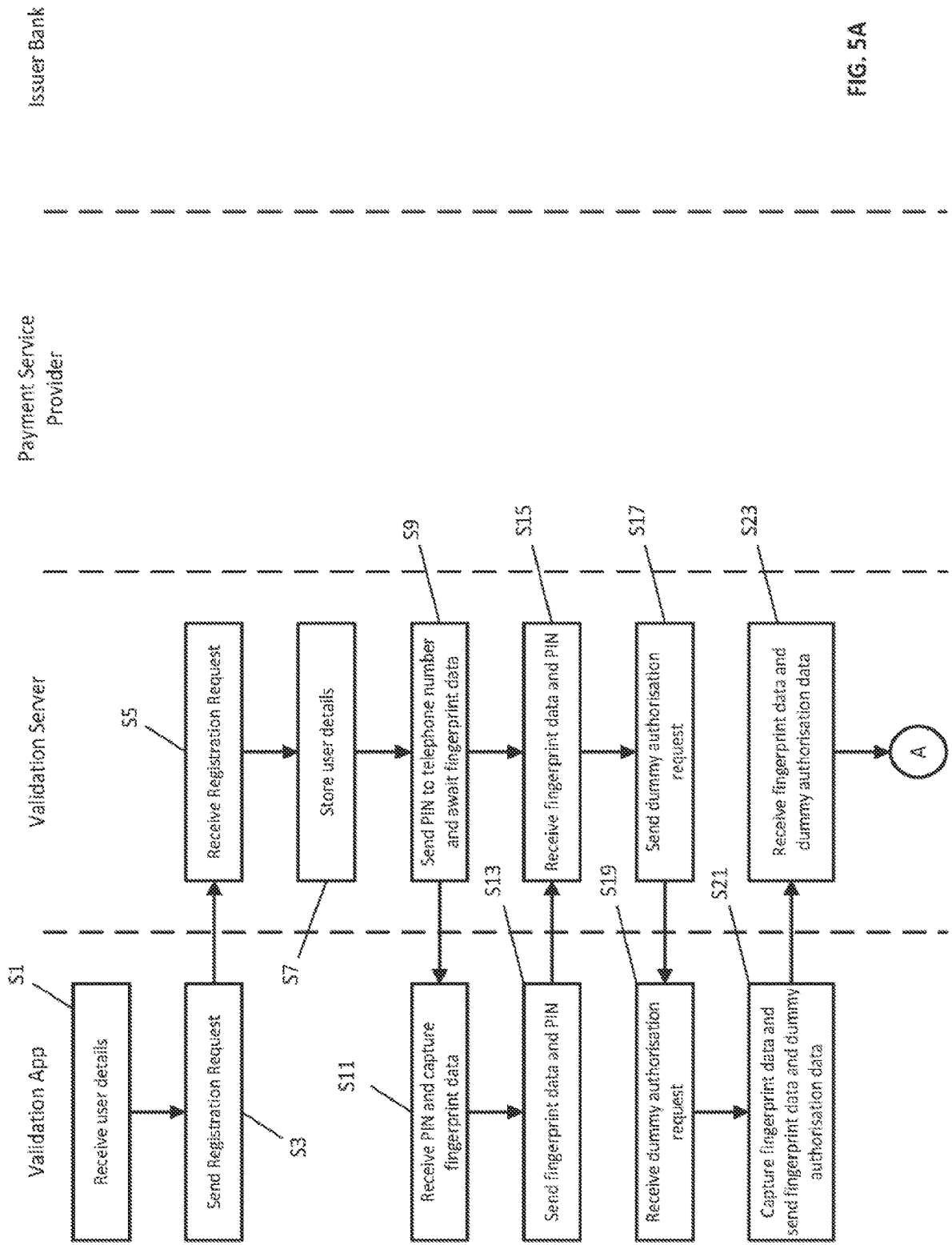
FIGS. 5A and 5B show a flow chart of operations performed to register a user of the electronic payment transaction system of FIG. 1.
Figure 5B:
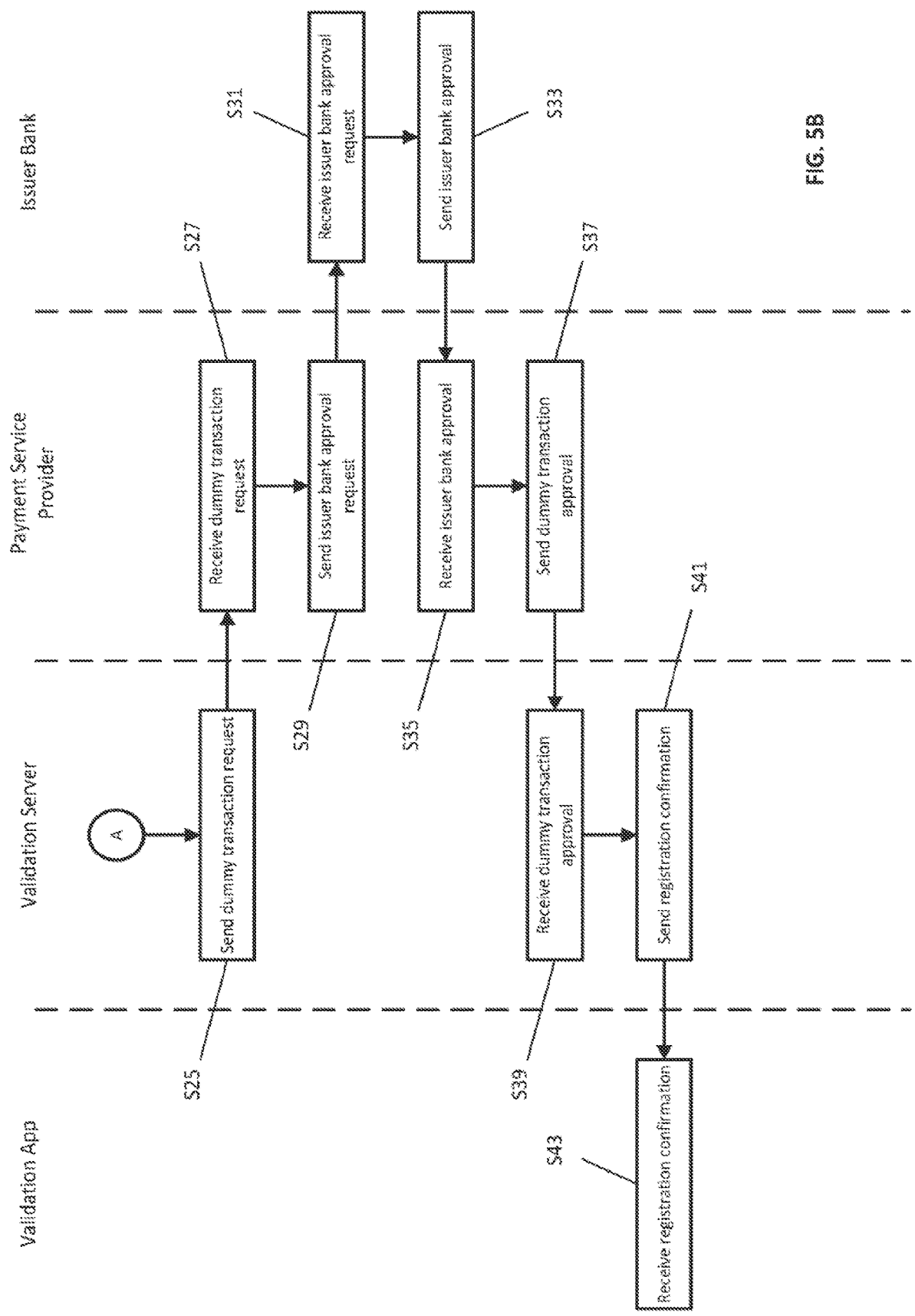

The manner in which a user of the smartphone 13 registers with the validation server 11 following downloading of the Biopay app 97 will now be described with reference to FIGS. 5A and 5B.

After opening the Biopay app 97 on the smartphone 13 for the first time, the Biopay app 97 prompts the user to enter user details including bibliographic details and financial instrument details. The bibliographic details include the name of the user, the mailing address of the user, the date of birth of the user, the email address of the user, and the telephone number of the user. In this example, the telephone number is in the form of the MSISDN. The financial instrument details include the Primary Account Number (PAN) and the expiry date. Following receiving, at S1, the user details, the Biopay app 97 establishes a secure connection to the validation server 11 and sends, at S3 a Registration Request to the validation Server 11 conveying the bibliographic details and the financial instrument details.

Following receipt, at S5, of the Registration Request, the Master_Control routine 61 triggers the Register_User sub-routine 63, which stores, at S7, the user details in a provisional entry for the user database 29 in the appropriate data fields and then sends, at S9, a PIN to the telephone number provided by the user using an SMS message or the like, and awaits fingerprint data from the Biopay app. The purpose of sending the PIN is to verify the provided telephone number.

Meanwhile, the Biopay app 97 prompts the user to enter the PIN following receipt of the PIN by the smartphone. After receiving, at S11, entry of the PIN by the user, the Biopay app 97 captures fingerprint data. In this embodiment, the Biopay app 97 prompts the user to place a finger on the fingerprint sensor 93 three times in order to generate fingerprint data including three fingerprint images. The Biopay app then sends, at S13, the fingerprint data and the entered PIN to the validation server 11.

Following receipt, at S15, of the fingerprint data and PIN, the validation server 11 verifies the PIN matches the PIN sent to the telephone number and then sends, at S17, a dummy authorisation request to the Biopay app 97. The purpose of this dummy authorisation request is to confirm the fingerprint data and verify the provided financial instrument details.

After receiving, at S17, the dummy authorisation request, the Biopay app 97 display details of the dummy authorisation request to the user (i.e. advising the user that the transaction is a dummy transaction), and prompts the user to authorise the dummy transaction by placing their finger on the fingerprint sensor 93. After capturing, at S21, fingerprint data, the Biopay app sends the fingerprint data along with dummy authorisation data to the validation server 11.

After receiving, at S23, the fingerprint data and the dummy authorisation data, the Verify_Fingerprint sub-routine 67 is initiated to verify that the fingerprint data received with the dummy authorisation data matches the fingerprint data previously received for the user. Having verified the fingerprint data. the validation server 11 sends, at S27, a dummy transaction request including the financial instrument details provided by the user to the payment service provider 7.

Following receipt, at S27, of the dummy transaction request, the payment service prover 7 sends, at S29, an issuer bank approval request to the issuer bank 9. After receiving, at S31, the issuer bank approval request, the issuer bank confirms the financial instrument details (among other checks) and then sends, at S33, issuer bank approval to the payment service provider 7. Following receipt, at S37, of the issuer bank approval, the payment service provider 7 sends, at S37, dummy transaction approval to the validation server 11.

After receiving, at S41, the dummy transaction approval, the validation server 11 completes the registration process by storing the bibliographic details, financial instrument details, fingerprint data for the user, and seed data in the user database 29, and sends, at S41, a registration confirmation to the Biopay app 97 including a copy of the seed data. In this embodiment, the seed data is a (pseudo-) random number.

Following receipt, at S43, of the registration confirmation, the Biopay app 97 displays a message to the user confirming registration has been successfully completed.

Once registered with the validation server 11, the user (or someone else) can specify the user's telephone number in place of the PAN when making a MOTO transaction, a web transaction or any other "card not present" transaction. In this way, the PAN for the user's financial instrument does not need to be supplied to the payee for the transaction, for example a merchant, which improves the security of the PAN. In addition, the electronic payment system allows a payment to be made when the user (or someone else) does not have access to the financial instrument, for example through being unable to find the financial instrument or forgetting to bring the financial instrument.

As has been described previously, the present invention allows someone other than the user to make a payment using the financial instrument of the user following approval of the user, who need not be local to the person making the payment. In this way, a user who wishes for someone else to be able to make a payment using their financial instrument does not need to give the PAN of their financial instrument to that person and also can approve the payment before it is made. For example, a parent may want to allow their child to use the financial instrument of the parent in certain circumstances, but not in others.

The manner in which an electronic payment transaction takes place will now be described with reference to FIGS. 6A and 6B, in which purchase payment details are received from a purchaser either by a merchant server, either via the website payment system 3 via the Internet or via the MOTO payment terminal 1. In the case of a MOTO transaction, an operator of the MOTO payment terminal 1 selects the Biopay payment option from a list of available payment options, in accordance with information received from the purchaser. In the case of an Internet purchase, the merchant website payment system 3 presents a list of payment options (including the Biopay payment option) to the purchaser and the purchaser selects the Biopay payment option. Selection of the Biopay payment option prompts the display of a form having data entry fields for payment details, including the payer telephone number, and the verification code.

As mentioned above, in the Biopay payment option the payment details specify a telephone number in place of specifying financial instrument details. In order to filter out attempts to use a telephone number for a payer that are unwanted by the payer, especially those which are malicious in nature, the Biopay payment option also requires entry of a verification code that is generated by the Biopay app 97 using the seed data. In this embodiment, the verification code varies over time. This can be achieved by, for example, including a time-varying value as well as the seed data in the calculation of the verification code or by including the current setting of a transaction counter as well as the seed data in the calculation of the verification code.

In this example, the form displayed by the Biopay payment option also includes a data field for entering time data representing the time when the verification code was generated. In this way, if the verification code was generated in advance of data being entered into the form for the Biopay payment option, as for example would typically be the case for a mail order transaction. In this way, the verification code can be checked even if it is not the valid verification code at the time of entry into the form of the Biopay payment option. Preferably, the time data is provided by the Biopay app 97, for example in the form of a time stamp.

Accordingly, if the purchaser is the same person as the payer, then when making a transaction the purchaser directly opens the Biopay app 97 and obtains the verification code that is valid at that time. If the purchaser is not the payer, then the purchaser must have obtained the verification code from the payer, possibly together with information indicating when the verification code was generated.

Following receiving, at S51, the payment details and the verification code together with associated time data, the merchant server sends, at S53, an authorisation request, via the acquirer bank 5, to the payment service provider 7. In this embodiment, the format of the authorisation request conforms to the ISO 8583 specification, but includes the telephone number in the data field for the PAN, data identifying that the Biopay payment option is being utilised in another data field and the verification code in a further data field. The authorisation request also includes further payment details, such as the amount of the transaction and information identifying the merchant.

Figure 6A:
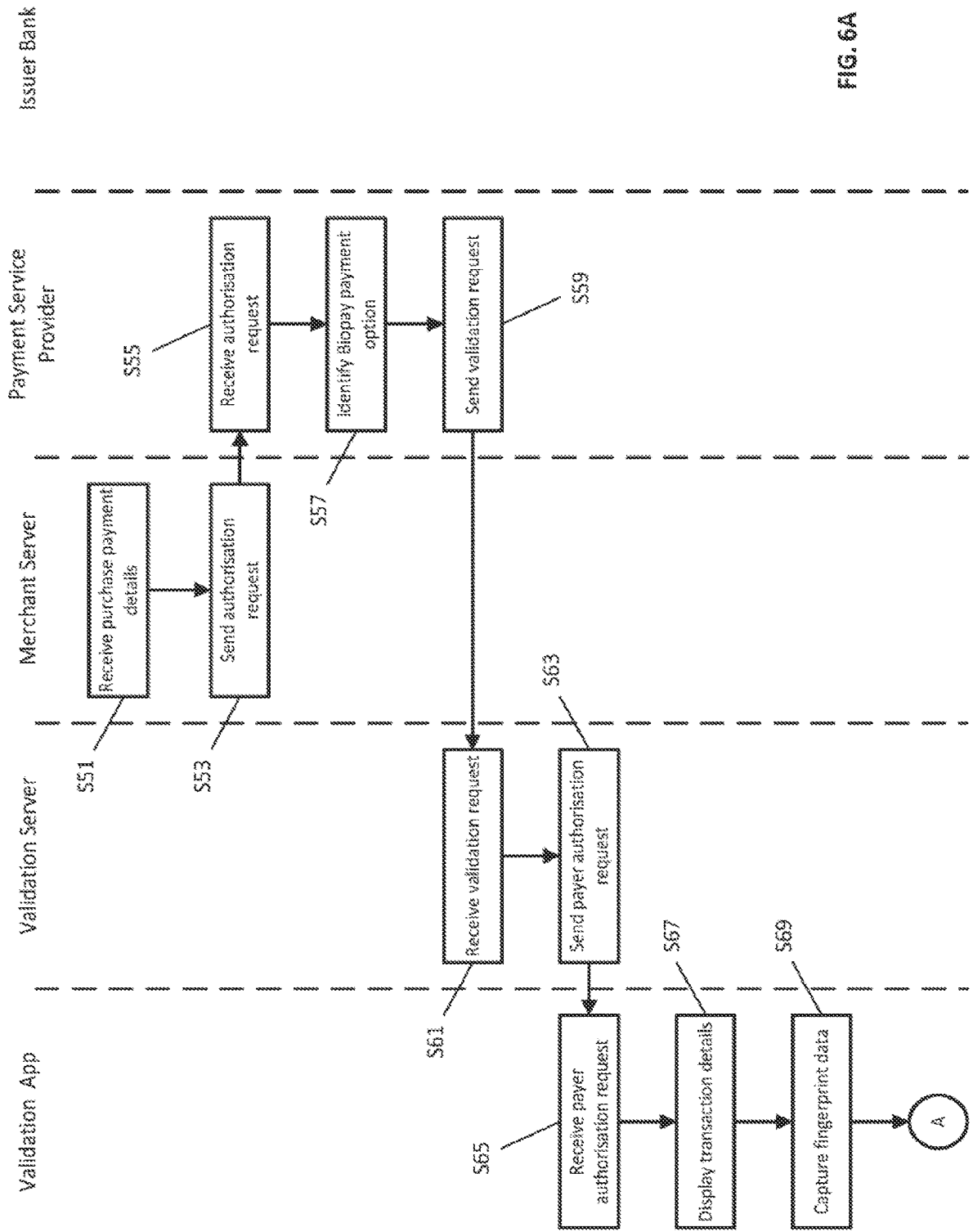

For ease of illustration, FIGS. 6A and 6B do not show the acquirer bank 5 and the conventional operations that may be performed by the acquirer bank 5. It will be appreciated that the authorisation request sent by the merchant server may not be identical with the authorisation request received by the payment service provider; nevertheless the authorisation request received by the payment service provider will include the telephone number provided in place of financial instrument details, the verification code, data identifying that the Biopay payment option is being used together with the amount of the purchase and information identifying the merchant.

After receiving, at S55, the authorisation request, the payment service provider identifies, at S57, that the Biopay payment option is being used. The payment service provider then sends, at S59, a validation request to the validation server 11 including the details provided in the authorisation request.

Receipt, at S61, of the validation request prompts the Master_Control routine 61 to initiate the Request_Payer_Authorisation sub-routine 65, which first checks that the entered telephone number corresponds to a telephone number for a registered user. If the entered telephone number does correspond to the telephone number of a registered user, then the Request_Payer_Authorisation sub-routine 65 then checks the validity of the verification code by determining, using the seed data 57 stored for that registered user and the time data, what the verification code should be and comparing the determined verification code and the received verification code.

If the determined verification code matches the received verification code, the validation server sends, at S63, a payer authorisation request to the Biopay app on the smartphone 13. In this embodiment, the Request_Payer_Authorisation sub-routine 65 checks if any information is stored in the merchant database 31 for the merchant identified in the validation request. For example, the merchant database 31 may store information indicating that the merchant is known or suspect to have taken part in fraudulent transactions. If there is information stored in the merchant database 31 for the identified merchant, then the Request_Payer_Authorisation sub-routine 65 appends this information to the payer authorisation request.

In this embodiment, the validation server 11 sends a push notification for the payer authorisation request via the push notification service 17 to ensure that the user of the smartphone 13 is alerted to the payer authorisation request as quickly as possible.

Following receipt, at S65, of the payer authorisation request and the user opening the Biopay app 97, the smartphone 13 displays, at S67, details of the transaction including the purchase amount, the name of the merchant and any information provided about the merchant from the merchant database 31, and prompts the user of the smartphone to approve the transaction by placing their finger on the fingerprint sensor 93. Although not shown in FIGS. 6A and 6B for ease of illustration, the user of the smartphone 13 is also given the opportunity to decline the transaction by a user input via the touchscreen 91.

Assuming that the user of the smartphone 13 approves the transaction by placing their finger on the fingerprint sensor 93, then the smartphone 13 captures, at S69, fingerprint data and sends, at S71, payer authorisation data indicating the electronic payment transaction is approved to the validation server 11 together with the fingerprint data.

Following receipt, at S73, of the payer authorisation data and the fingerprint data, the Master_Control routine 61 initiates the Verify_Fingerprint sub-routine 67 to verify, at S75, the fingerprint data against the fingerprint data stored in the entry of the user database 29 for the user of the smartphone 13. In this way, the identity of the payer is authenticated, which improves protection against fraud in comparison with "card not present" payment schemes in which the identity of the payer is not authenticated.

Assuming the fingerprint data is verified, the Master_Control routine 61 initiates the Provide_Transaction_Data sub-routine 69 to generate and send, at S77, a validation response to the payment service provider 7. The validation response includes the financial instrument details (PAN and expiry date) stored in the entry in the user database 29 for the user of the smartphone 13. In this way, following receipt, at S79, of the validation response, the payment service provider can send, at S81, an issuer bank approval request to the issuer bank 9 identifying the PAN of the financial instrument of the payer.

After receiving, at S83, the issuer bank approval request, the issuer bank 9 can perform various checks and, assuming that the checks do not identify a problem, send, at S85, issuer bank approval to the payment service provider 11. Following receipt, at S87, of the issuer bank approval, the payment service provider 7 sends, at S91, payment confirmation to the merchant and sends, at S93, payment confirmation to the validation server 11. The payment confirmation is received by the validation server 11 and forwarded, at S95, to the Biopay app 97, which accordingly receives, at S97, the payment confirmation and displays a payment confirmation message to the user of the smartphone 13.

As mentioned above, the merchant database 31 is populated with information about merchants that may be pertinent to an electronic payment transaction. This information may be received from one of the participants in the electronic payment transaction identified above, or an external service provider. On receipt of information about a merchant, the Master_Control routine 61 of the validation server 11 initiates the Log_Merchant_Information sub-routine 71 to store the information in the entry for the merchant in the merchant database 31.

Modifications and Further Embodiments

In the illustrated embodiment, the payment service provider identifies that the Biopay payment option is being used, prompting validation via the validation server 11 and the Biopay app 97. In other embodiments, identification of the use of the Biopay payment option could be performed by a merchant server or an acquirer bank or by an intermediate Internet Payment Service Provider (IPSP). However, it is preferred that the PAN is not provided to a merchant server in order to improve security.

Fingerprint data is used in the illustrated embodiment to authenticate the user of the smartphone 13. It will be appreciate that other types of biometric data could be used, for example facial recognition, iris scan or voice analysis. More generally, the identity of the user of the smartphone 13 can be authenticated by any of a variety of techniques, sometimes referred to as consumer device cardholder verification methods (CDCVMs), not all of which employ biometric data.

While the illustrated embodiment takes advantage of a push notification service, this is not essential and various "pull" techniques could be employed, for example using polling, by which the Biopay app 97 could discover whether an approval request is outstanding.

The Biopay app 97 need not be run on a smartphone, but could alternatively be run on a tablet device or a computing device (such as a laptop computer) having wireless communications capability for communicating via a public land mobile network (PLMN).

While it is convenient to use a telephone number to identify a registered participant, this is not essential and other identifiers for the registered user (alternatively referred to as a participant), including bespoke identifiers, could be used.

Although the illustrated embodiment concerns authorisation of a financial transaction, the invention also has applicability outside of the field of financial transactions. For example, the invention has applicability to the field of access systems for accessing secure premises that require entry of an access code. Instead of an access code, an identifier for a registered participant could be issued, prompting approval from the registered participant via an application stored on their smartphone.

The various memories described above may take the form of any suitable date store, including Random Access Memory (RAM) and/or Read Only Memory (ROM) data stores. The various processors may take the form of a semiconductor chip, such as a Central Processing Unit (CPU) for example.

Methods described herein may be implemented by way of computer program code that is storable in a memory. Memory may be any non-transitory computer-readable media able to contain, store, or maintain programs and data for use by or in connection with an instruction execution system. Such media may be any physical media such as, for example, electronic, magnetic, optical, electromagnetic, or semiconductor media. More specific examples of suitable media include, but are not limited to, a hard drive, RAM, ROM, erasable programmable read-only memory, or a portable disc. Elements of the memory used to store program code may be volatile or non-volatile and may include additional functionality, for example to minimise latency.

The above embodiments are to be understood as illustrative examples of the invention. Further embodiments of the invention are envisaged. For example, [add possibilities]. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:
1. A method comprising:
receiving, by a validation server from a payment service provider server, transaction details for an electronic transaction initiated by a participant, a non-financial identifier for a user, and a verification code generated using time data provided by the user and seed data;
determining a generated verification code using the time data and stored seed data associated with the user;
comparing the verification code to the generated verification code that is generated using the time data and stored seed data associated with the user;
verifying the verification code upon determining that the verification code matches the generated verification code;
sending, to a validation application executing on a mobile communications device of the user and using the non-financial identifier, the transaction details via a push notification presented on the mobile communications device;
receiving, from the validation application on the mobile communications device, authorization data and authentication data of the user that is captured by the validation application and an associated biometric sensor;
comparing, the authentication data to stored authentication data previously received from the validation application to confirm an identity of the user;
confirming the identity of the user upon finding a match between the authentication data and the stored authentication data;
retrieving, from a database storing a mapping between a financial identifier of the user and the authentication data, the financial identifier identifying an account associated with the user in response to confirming the identity of the user; and transmitting, by the validation server to the payment service provider server, the financial identifier, wherein an authorization request message comprising the financial identifier instead of a telephone number of the user is transmitted to an issuing bank, wherein the issuing bank authorizes or declines the authorization request message.

2. The method according to claim 1, wherein the authentication data comprises one or more of fingerprint biometric data, facial recognition biometric data or iris scan biometric data authenticating an identity of the participant.

3. The method according to claim 1, further comprising:
receiving, by the validation server from the payment service provider server, a payment confirmation; and
transmitting, by the validation server, the payment confirmation to the validation application on the mobile communications device.

4. The method according to claim 1, wherein the participant and the user are different entities.

5. The method according to claim 1, wherein the participant and the user are a same entity.

6. The method according to claim 1, further comprising:
prior to receiving the transaction details, registering the user with the validation server by:
receiving, from the validation application on the mobile communications device via a secure connection, a registration request including bibliographic details and the financial identifier of the user, wherein the bibliographic details include the non- financial identifier of the user;
verifying, by the validation server, the bibliographic details and the financial identifier provided by the user;
transmitting a dummy authorization request message including the financial identifier to the issuing bank; and
upon receiving, by the validation server, a dummy authorization response message from the issuing bank, storing the bibliographic details, the authentication data, and the financial identifier of the user.

7. The method according to claim 6, wherein verifying the bibliographic details provided by the user further comprises:
transmitting, by the validation server, confirmation data to the user using the bibliographic details, wherein the user provides the confirmation data and the authentication data to the validation application;
receiving, by the validation server from the validation application, the confirmation data and the authentication data provided by the user; and
determining, by the validation server, that the confirmation data received from the user matches the confirmation data sent to the user.

8. The method according to claim 6, wherein verifying the financial identifier provided by the user further comprises:
transmitting a dummy transaction request message to the validation application;
receiving, by the validation server, dummy authorization data and the authentication data from the validation application; and
determining, by the validation server, that the authentication data received from the user matches the authentication data previously provided by the user.

9. The method according to claim 1, wherein the non-financial identifier of the user comprises one or more of a name of the user, a mailing address of the user, a date of birth of the user, an email address of the user, or a telephone number of the user.

10. A validation server comprising:
at least one processor; and
a memory storing instructions that, when executed by the at least one processor, cause the at least one processor to perform steps comprising:
receiving, from a payment service provider server, transaction details for an electronic transaction initiated by a participant, a non-financial identifier for a user, and a verification code generated using time data provided by the user and seed data;
determining a generated verification code using the time data and stored seed data associated with the user;
comparing the verification code to the generated verification code that is generated using the time data and stored seed data associated with the user;
verifying the verification code upon determining that the verification code matches the generated verification code;
sending, to a validation application executing on a mobile communications device of the user and using the non-financial identifier, the transaction details via a push notification presented on the mobile communications device;
receiving, from the validation application on the mobile communications device, authorization data and authentication data of the user that is captured by the validation application and an associated biometric sensor;
comparing, the authentication data to stored authentication data previously received from the validation application to confirm an identity of the user;
confirming the identity of the user upon finding a match between the authentication data and the stored authentication data;
retrieving, from a user database storing a mapping between a financial identifier of the user and the authentication data, the financial identifier identifying an account associated with the user in response to confirming the identity of the user; and
transmitting, to the payment service provider server, the financial identifier, wherein an authorization request message comprising the financial identifier instead of a telephone number of the user is transmitted to an issuing bank, wherein the issuing bank authorizes or declines the authorization request message.

11. The validation server according to claim 10, wherein the authentication data comprises one or more of fingerprint biometric data, facial recognition biometric data or iris scan biometric data authenticating an identity of the participant.

12. The validation server according to claim 10, wherein the instructions, when executed by the at least one processor, cause the at least one processor to perform steps comprising:
receiving, from the payment service provider server, a payment confirmation; and
transmitting the payment confirmation to the validation application on the mobile communications device.

13. The validation server according to claim 10, wherein the participant and the user are different entities.

14. The validation server according to claim 10, wherein the participant and the user are a same entity.

15. The validation server according to claim 10, wherein the instructions, when executed by the at least one processor, cause the at least one processor to perform steps comprising:
prior to receiving the transaction details, registering the user with the validation server by:

receiving, from the validation application on the mobile communications device via a secure connection, a registration request including bibliographic details and the financial identifier of the user, wherein the bibliographic details include the non-financial identifier of the user;

verifying the bibliographic details and the financial identifier provided by the user;

transmitting a dummy authorization request message including the financial identifier to the issuing bank; and upon receiving a dummy authorization response message from the issuing bank, storing the bibliographic details, the authentication data, and the financial identifier of the user.

16. The validation server according to claim 15, wherein verifying the bibliographic details provided by the user further comprises:

transmitting confirmation data to the user using the bibliographic details, wherein the user provides the confirmation data and the authentication data to the validation application;

receiving, from the validation application, the confirmation data and the authentication data provided by the user; and determining that the confirmation data received from the user matches the confirmation data sent to the user.

17. The validation server according to claim 15, wherein verifying the financial identifier provided by the user further comprises:

transmitting a dummy transaction request message to the validation application;

receiving dummy authorization data and the authentication data from the validation application; and determining that the authentication data received from the user matches the authentication data previously provided by the user.

18. The validation server according to claim 10, wherein the non-financial identifier of the user comprises one or more of a name of the user, a mailing address of the user, a date of birth of the user, an email address of the user, or a telephone number of the user.

19. The validation server according to claim 10, further comprising:

the user database storing the mapping between the financial identifier of the user and the authentication data; and a merchant database storing information about one or more merchants, wherein the electronic transaction is between the participant and a merchant, wherein the instructions, when executed by the at least one processor, cause the at least one processor to perform steps comprising:

checking the merchant database for an entry associated with the merchant; and incorporating the entry associated with the merchant in the push notification sent to the validation application, wherein the entry associated with the merchant is displayed on the mobile communications device along with the transaction details.

20. A system comprising:

the validation server according to claim 10; and the validation application executing on the mobile communication device.

\* \* \* \* \*